Jan. 10, 1956  F. X. REIMSPIESS ET AL  2,730,375
INDEPENDENT WHEEL SUSPENSIONS FOR THE
STEERABLE WHEELS OF MOTOR VEHICLES
Filed Jan. 29, 1953
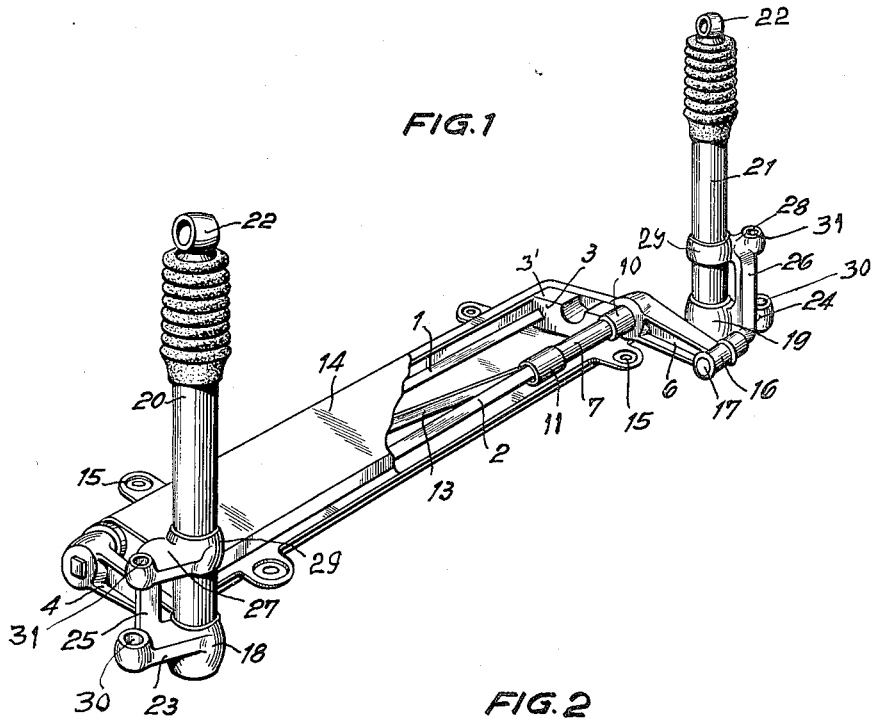
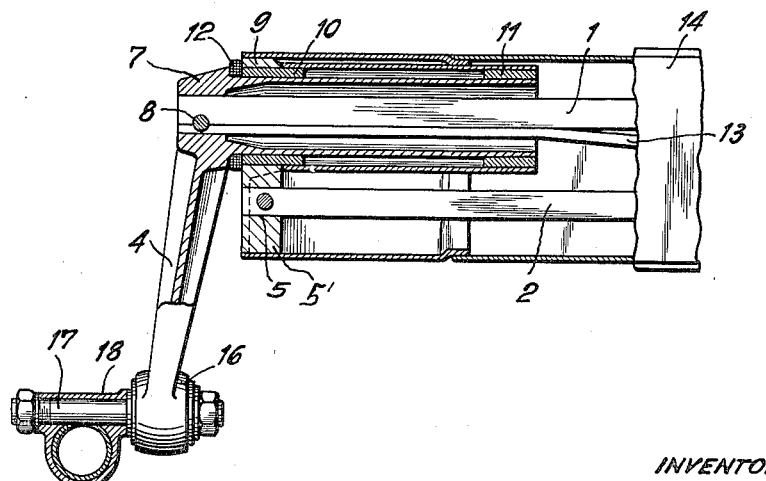
INVENTORS
Ferdinand A. E. Porsche
Franz Xaver Reimspiess
By
Pennie, Edmonds, Morton, Barrows & Taylor
Attorneys

United States Patent Office 2,730,375
Patented Jan. 10, 1956

2,730,375

INDEPENDENT WHEEL SUSPENSIONS FOR THE STEERABLE WHEELS OF MOTOR VEHICLES

Franz Xaver Reimspiess and Ferdinand A. E. Porsche, Stuttgart, Germany, assignors to Dr. Ing. h. c. F. Porsche K.-G., Stuttgart-Zuffenhausen, Germany Application January 29, 1953, Serial No. 333,906

Claims priority, application Germany February 4, 1952

4 Claims. (Cl. 280—124)

This invention relates to improvements in independent wheel ssupensions for the steerable wheels of motor vehicles, and more particularly to such a suspension including arms respectively influenced by torsion bar springs, the arms being adapted to rock in the direction of travel of the vehicle or on axes at right angles to the longitudinal axis of the vehicle.

The primary object of the invention is to provide a simple, easily assembled and dismantled wheel suspension which does not include any special means for guiding the steerable wheels of the vehicle in a straight path of movement relative to the body of the vehicle.

In known constructions of the kind under consideration, it has been found necessary to use two superposed arms forming a parallelogram in order to provide for the straight up and down guiding of the steerable vehicle wheels. These prior constructions not only entail greater cost than that necessary for the suspension of the present invention, but they also have the great disadvantage that the overall height of the springing unit is too great. Additional space must also be provided for housing a device or mechanism for preventing canting when negotiating curves.

According to the present invention the foregoing disadvantages are overcome or avoided by providing a front axle suspension including an arm for each steerable wheel of the vehicle, one end of the arm being fixed to and influenced by a torsion bar spring, while the other end of the arm is pivotally connected to a vertically suspended shock absorber and supports the axle journal carrier or bearings for the steerable wheel. This structure provides for the straight up and down guiding of the wheel relative to the vehicle body in a simple manner without the necessity of a parallelogram guide.

In an advantageous and preferred construction, the suspension unit includes a torsion bar spring for each steerable wheel, these springs being located adjacent and parallel to each other in a horizontal plane in a mounting and extending transversely across the width of the vehicle frame. In this structure, one end of each torsion bar spring is clamped in the mounting, at its opposite ends, while the unclamped ends, which are respectively rigidly connected to the arms, are interconnected by a stabilizer. In this construction, the stabilizer is located between the torsion bar springs and utilizes this available space, the springs being supported in a casing by which the whole front axle suspension is fastened, by screws, bolts or other means, to the under side of the frame or body of the vehicle. Since the torsion bar springs and stabilizer are located adjacent each other in a horizontal plane, the enclosing casing is flat and occupies very little space under the frame or body, and is furthermore readily detachable.

In the construction as described above, the oppositely disposed arms are made exactly alike, although it might be supposed that torsion bar springs juxtaposed in a horizontal plane would require arms of different length. In the present instance, the difference or distance between the torsion bar springs is compensated for by the expedient of connecting one shock absorber on one side of the arm pivot and the other shock absorber on the other side of the arm pivot. By this arrangement one shock absorber is held in the extension of one arm and the other shock absorber mounted in the other direction with respect to the other arm. The advantage thus obtained is that the wheel suspension on each side of the vehicle consists of similar parts, thereby simplifying its manufacture and facilitating assembly.

In a preferred construction, the stabilizer referred to consists of a torsion bar spring, one end of which is coupled in a rotary sense with the unclamped end of one of the torsion bar springs while its other end is coupled with the obliquely opposite unclamped end of the other torsion bar spring.

Other objects, features and advantages of the suspension unit of the present invention will be described hereinafter in connection with the accompanying drawings forming a part of this application and which show one constructional form of the invention.

In the drawings:

Fig. 1 is a perspective view of a suspension unit for the steerable wheels of a vehicle constructed in accordance with the invention, with parts broken away and other parts removed to clarify the showing; and Fig. 2 is a broken central horizontal sectional view through one side of the wheel suspension unit shown in Fig. 1, and to a larger scale.

The constructional embodiment of the invention shown in the drawings comprises a front axle suspension unit for the steerable wheels of a motor vehicle and includes a casing 14 housing two similar torsion bar springs 1 and 2 disposed in parallel spaced relationship adjacent to each other in the casing. One end of the torsion bar spring 1 is non-rotatably fixed at 3 in a support 3' set in one end of the casing 14, while the other end of the spring 1 is rigidly and non-rotatably connected with one end of a longitudinally-extending arm 4. The torsion bar spring 2 is mounted in the same manner with one end non-rotatably fixed at 5 in a support 5' set in the opposite end of the casing 14 from the support 3', the opposite end of the spring 2 being rigidly and non-rotatably connected with one end of a longitudinally-extending arm 6. While, not shown, each of the torsion bar springs 1 and 2 is preferably composed of a bundle of narrow rectangular bar springs, the separate bars of which may be welded together at some places along their length.

One end of each of the torsion bar springs 1 and 2 is supported together with an end of an additional spring bar, or spring bar bundle 13, in a supporting sleeve 7 comprising an integral part of the respective arms 4 and 6. The sleeves 7 extend around a portion of the respective torsion bar springs 1 and 2, in the manner shown in Fig. 2. Screws 8 applied as shown in Fig. 2, are provided for fixing and securing the spring bar 13 against axial displacement, the screws 8 being respectively located in the portions of the arms 4 and 6 into which the ends of the torsion bar springs 1, 2 and 13 extend. In the structure shown in Fig. 2, the supporting sleeve 7 of each of the arms 4 and 6 is in turn rotatively supported at the ends of a sleeve-like insertion 9 by means of spaced bushings or bearings 10 and 11. A packing ring 12 is located around the sleeve 7 inside the hub of the arm and outside the bushing 10.

The additional torsion bar spring 13 extends from the arm 4 to the arm 6 and is rigidly clamped and arranged in the same manner at both ends, as shown in detail in Fig. 2. This torsion bar spring 13 thus connects the unclamped or rotatable ends of the torsion bar springs 1 and 2 and acts as a stabilizer for these springs and the wheel suspension as a whole.

The flat casing 14 surrounds the torsion bar springs 1, 2 and 13 and their supports, and is provided with bearing eyes or attachment lugs 15 by which the suspension may be fixed in an easily removable manner to the bottom part of the body of a vehicle, in the case of a self-supporting body structure, or to the vehicle frame.

The free end of each of the arms 4 and 6, which swing in the direction of travel of the vehicle or which pivot about axes at right angles to the longitudinal center line of the vehicle, are provided with bearing eyes 16 in which journals pins 17 are mounted. These pins 17 pivotally support the wheel axle journal bearings and are arranged parallel to the sleeve shaft sections 7. The axle journal bearings for the steerable wheels consist of caps 18 and 19 respectively, pivotally supported on the journal pins 17. These caps form the bottom closures of shock absorbers 20 and 21, respectively, which are each provided with bearing eyes 22 by which they are fixed to the vehicle frame or body in such a manner as to be substantially vertical. The caps 18 and 19 are provided with brackets 23 and 24, respectively, which form the lower bearings 30 for the axle journal pins not shown. The upper bearings 31 for the axle journal pins are provided respectively by stirrups 25 and 26, respectively, extending from brackets 23 and 24, and bearing brackets 27 and 28, respectively located above the brackets 23. The upper brackets 27 and 28 each include a portion 29 respectively extending around the cylinders of the shock absorbers 20 and 21, as shown in Fig. 1 of the drawings. It will be understood that, while the steerable wheels and their stub axles are not shown, their respective journals will be pivotally connected to the journal bearings 30—31 provided on the projecting portions of brackets 23 and 27 at one side and the projecting portions of brackets 24 and 28 at the opposite side of the suspension unit.

Since the torsion bar springs 1 and 2 lie one behind the other and the arms 4 and 6 are of the same length and extend in the same direction, some arrangement must be made for mounting the steerable wheels so that their axes are normally in the same vertical transverse plane. This object is achieved by attaching one of the axle journal carriers and its shock absorber backwards to the arm 4 and the other axle journal carrier and its shock absorber forward to the arm 6, that is, the journal carrier at the left including the cap 18 and the shock absorber 20 is mounted back of the pin 17, as shown in Fig. 2, while the journal carrier at the opposite side of the suspension unit including the cap 19 and the shock absorber 21 is mounted forward of the pin 17, as shown at the right in Fig. 1. In this arrangement, the elements are such that the distance between the axes of the torsion bar springs 1 and 2, or the pivot axes of the sleeves 7, is equal to twice the distance from the axis of the arm bolt or pin 17 to the axis of the shock absorber or axle journal bearings 30—31 associated therewith. With the journal carriers arranged in this way, the axes of the steerable wheels will be in the same vertical transverse plane, even though the arms 4 and 6 are of the same length. This construction and arrangement has the advantage that it becomes possible to use identical constructional parts for each side of the wheel suspension unit. In other words, the arrangement is such that the parts are interchangeable between the right and left sides of the suspension unit.

No special guides are required in the suspension unit of the present invention for keeping the wheels vertical, with only one crank arm on each side. Should one of the wheels be lifted more than the other, relative to the body of the vehicle owing to inequalities of the ground or in negotiating a curve, and one side of the wheel suspension unit be stressed more severely than the other, the balance will be established by the stabilizer 13, as will be understood from the relationship shown and described between the stabilizer and the torsion bar springs 1 and 2.

During the up and down movement of the wheels relative to the body of the vehicle the shock absorbers cushion the action of the torsion springs on the arms and they in cooperation with the arms maintain the steerable wheels in straight vertical planes.

The wheel suspension according to the invention is applicable for constructions which have only one transverse torsion bar spring, clamped in the middle against rotation, and to the ends of which the longitudinally extending arms are fixed as in the manner shown in the drawings.

The suspension unit constructed according to the features of the present invention occupies a very small space because of the nature and relationship of the spring and stabilizing elements which are housed in a flat casing. Furthermore, no additional constructional parts are required for the attachment of the stabilizer unit to the body or frame of a vehicle.

We claim:

1. A wheel suspension unit for the steerable wheels of motor vehicles, comprising a pair of torsion bar springs disposed substantially parallel to each other and extending transversely of the vehicle, said torsion bar springs being held rigidly at one end with said rigidly-held ends of the torsion bar springs being located at opposite sides of the unit, a stabilizer interconnecting and rigidly held with respect to the other ends of the pair of torsion bar springs, a pair of suspension arms for respectively supporting the steerable wheels, said suspension arms being rigidly secured at one end respectively to the said other ends of the torsion bar springs, the suspension arms being alike and each having a free end extending longitudinally of the vehicle and arranged for up and down movement, and an axle journal carrier for a steerable wheel pivoted to the movable free end of each arm.

2. In a wheel suspension unit for a pair of steerable wheels of motor vehicles, including a suspension arm for each steerable wheel pivoted at one end on a horizontal transverse pivot and having a free end extending longitudinally of the vehicle and arranged for up and down movement, a pair of substantially parallel torsion bar springs located in spaced relation in a substantial horizontal plane and extending transversely of the vehicle, one end of each of said torsion bar springs being held rigidly in the unit, said rigidly-held ends being located at opposite sides of the vehicle, the other ends of said torsion bar springs being rigidly secured respectively to the pivoted ends of said arms, and a torsion bar spring stabilizer located in said plane and extending generally diagonally through the space between said pair of torsion bar springs, the ends of the torsion bar spring stabilizer being rigidly secured respectively to the said other end portions of the torsion bar springs of said pair.

3. In a wheel suspension unit for a pair of steerable wheels of motor vehicles, including a casing extending transversely of the vehicle and adapted to be fixed to the underside of the frame or body of the vehicle, a pair of arms respectively for the pair of steerable wheels, said arms being pivoted from one end thereof to said casing respectively on opposite sides of the vehicle, each arm being pivoted on a horizontal pivot axis and having a free end extending longitudinally of the vehicle and arranged for up and down movement, a pair of substantially parallel spaced torsion bar springs located in said casing and extending transversely of the vehicle, one end of each of said torsion bar springs being held rigidly in the casing, said rigidly held ends being located at opposite sides of the vehicle, the other end portions of said pair of torsion bar springs extending respectively in line with the horizontal pivot axes of the pivoted ends of said suspension arms and being respectively rigidly secured to the pivoted ends of said suspension arms, and a stabilizing torsion bar spring located in said casing between said pair of torsion bar springs and having its ends rigidly secured respectively to said other end portions of the torsion bar springs of said pair.

4. A wheel suspension unit for the steerable wheels of motor vehicles having a frame or body in which the axes of the steerable wheels are in the same transverse vertical plane, comprising a casing adapted to be fixed to the underside of the frame or body of the motor vehicle, a pair of torsion bar springs supported in said casing in spaced parallel relation in a substantially horizontal plane and extending transversely of the vehicle substantially parallel to and to one side of said vertical plane, one end of each torsion bar spring being non-rotatably fixed and held, the non-rotatably fixed ends of the springs being located at opposite sides of the suspension unit, a suspension arm for each steerable wheel having one end for connection with and for supporting said wheel, the other ends of said arms being non-rotatably connected respectively with the said other ends of said torsion bar springs, the suspension arms being alike and extending longitudinally of the vehicle from their respective torsion bar springs in the direction toward but to different points longitudinally of the vehicle with respect to said transverse vertical plane because of the relative positions of said pair of torsion bar springs longitudinally of the vehicle with respect to said transverse vertical plane, and a pair of wheel-axle journal carriers pivoted respectively to the said other ends of said suspension arms, the axle journal carrier pivoted to the suspension arm connected to the torsion bar spring nearer to said transverse vertical plane being located between its pivot point and said nearer torsion bar spring while the axle journal carrier pivoted to the other suspension arm is located on the side of its pivot point with the other suspension arm remote from the torsion bar spring to which said other suspension arm is connected, whereby the axle journal carriers are located so that the axes of the steerable wheels to be carried thereby are in said transverse vertical plane.

References Cited in the file of this patent
UNITED STATES PATENTS

| | | |
|---|---|---|
| 2,254,261 | Best | Sept. 2, 1941 |
| 2,523,473 | Leighton | Sept. 26, 1950 |
| 2,606,759 | Colby | Aug. 12, 1952 |